No. 896,461. PATENTED AUG. 18, 1908.
A. F. PRESTON.
BINDING MACHINE.
APPLICATION FILED MAR. 21, 1908.
6 SHEETS—SHEET 1.
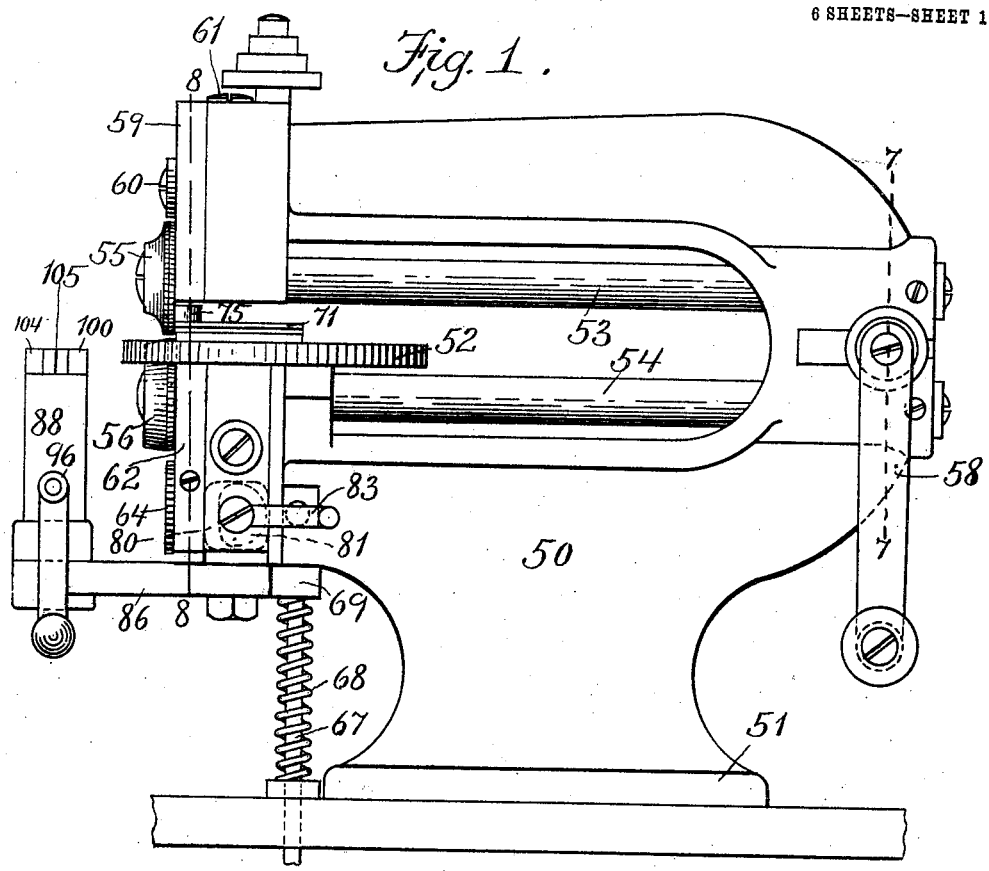
Fig. 1.
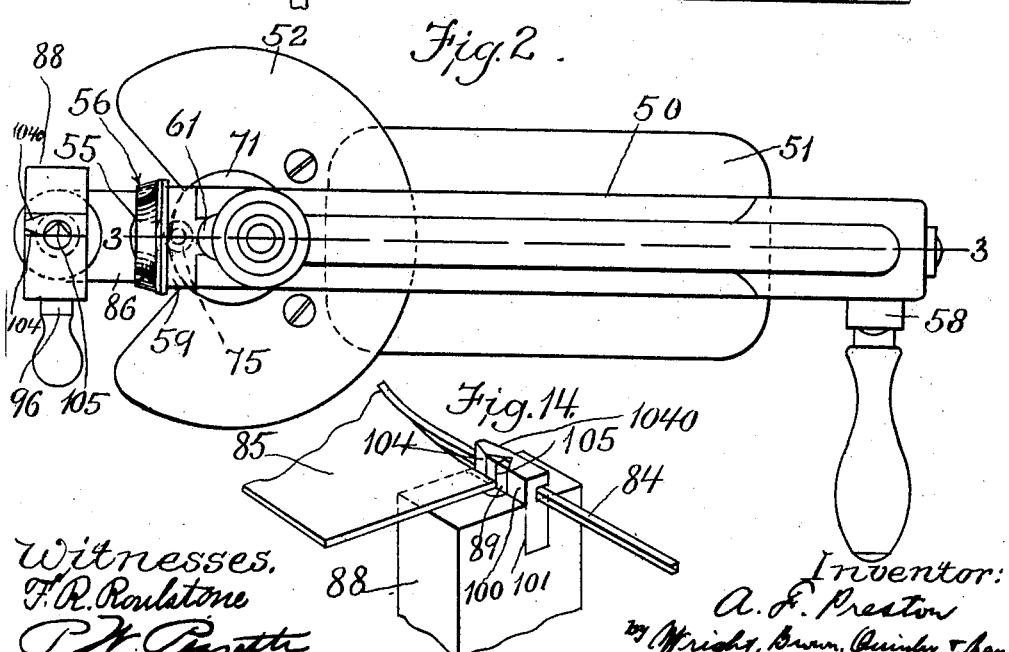
Fig. 2.
Fig. 14.
Witnesses.
F. R. Roulstone
P. W. Pezzetti
Inventor:
A. F. Preston
by Wright, Brown, Quinby & May
Attys

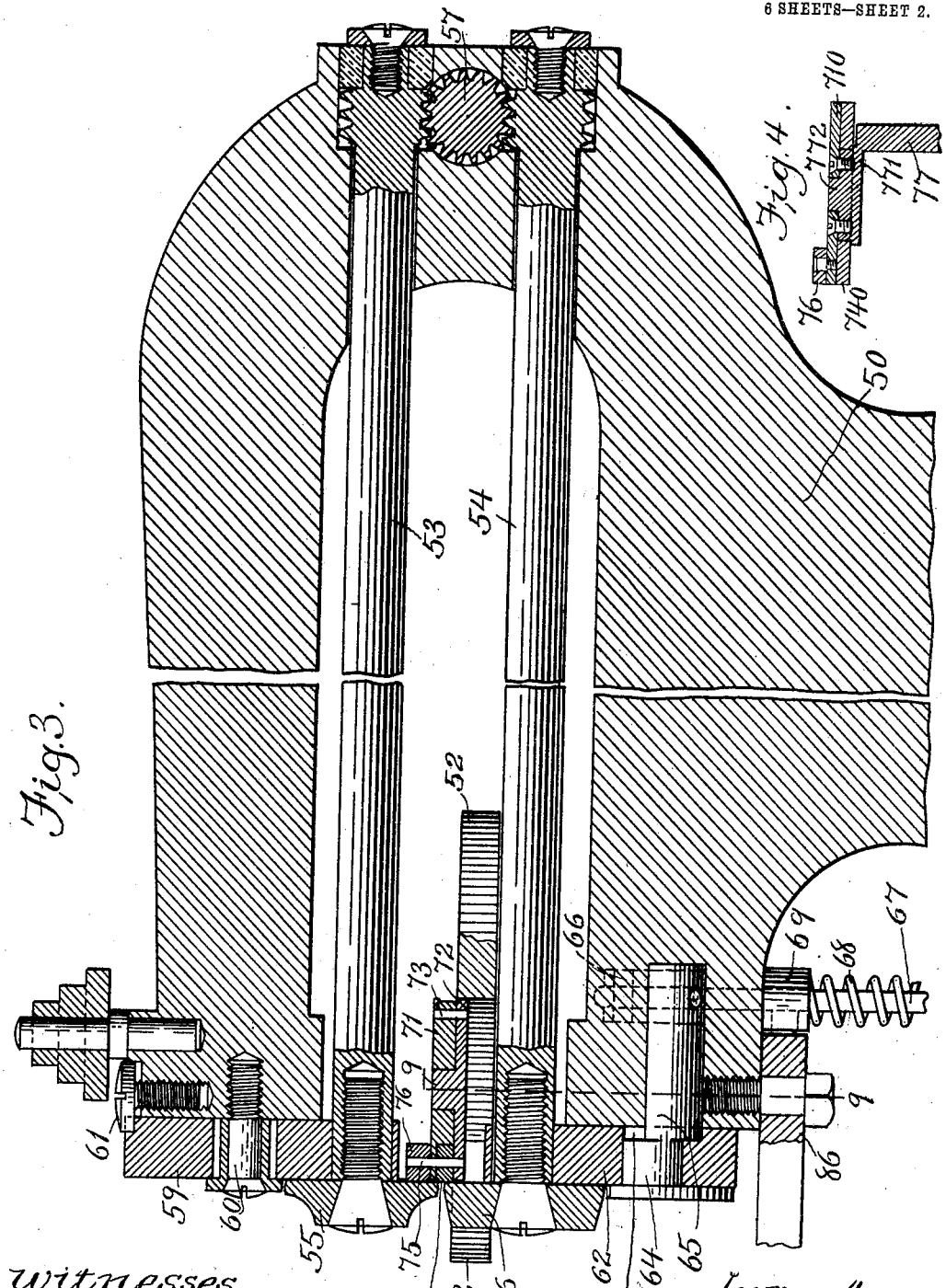

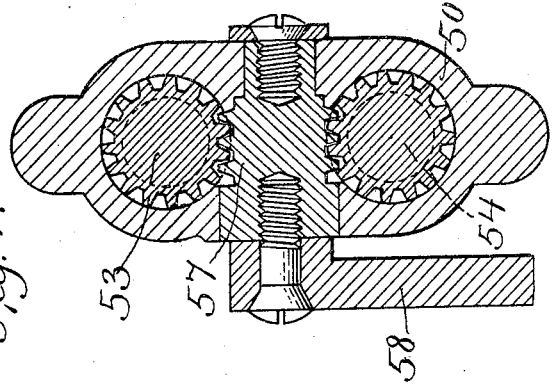
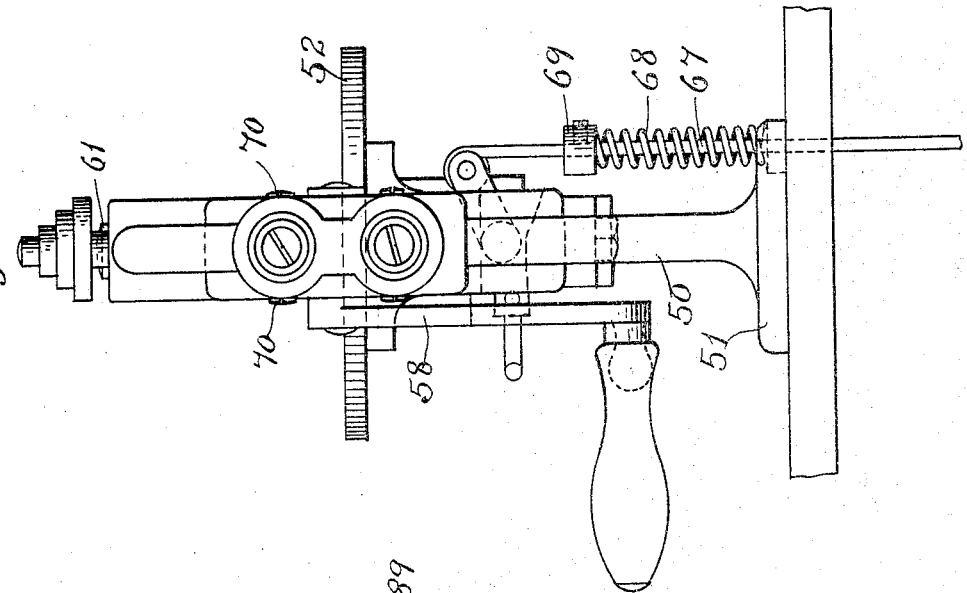
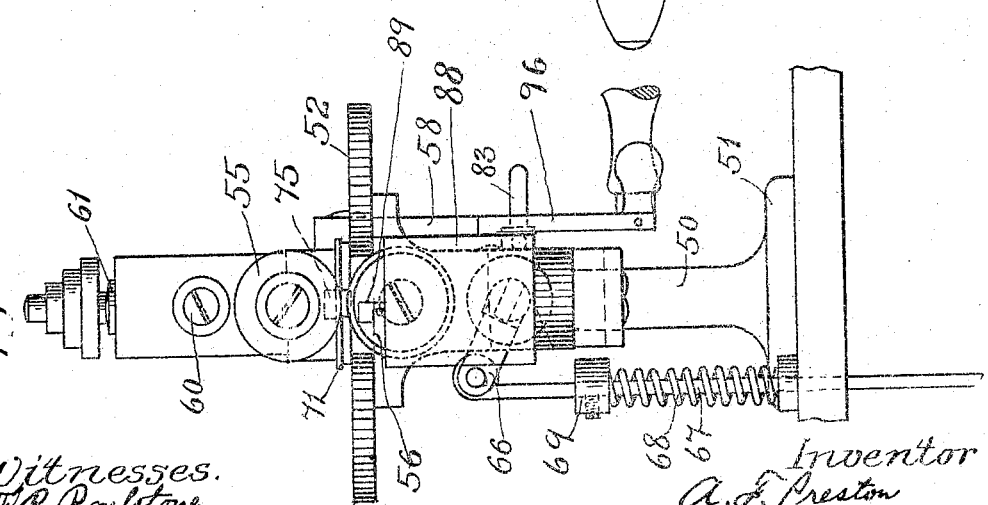

No. 896,461.
PATENTED AUG. 18, 1908.
A. F. PRESTON.
BINDING MACHINE.
APPLICATION FILED MAR. 21, 1908.
6 SHEETS—SHEET 4.
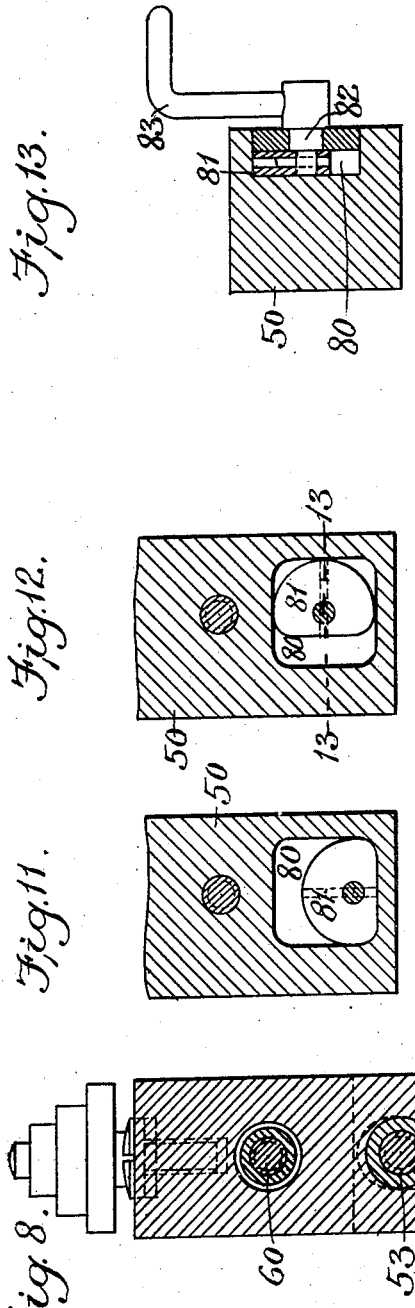
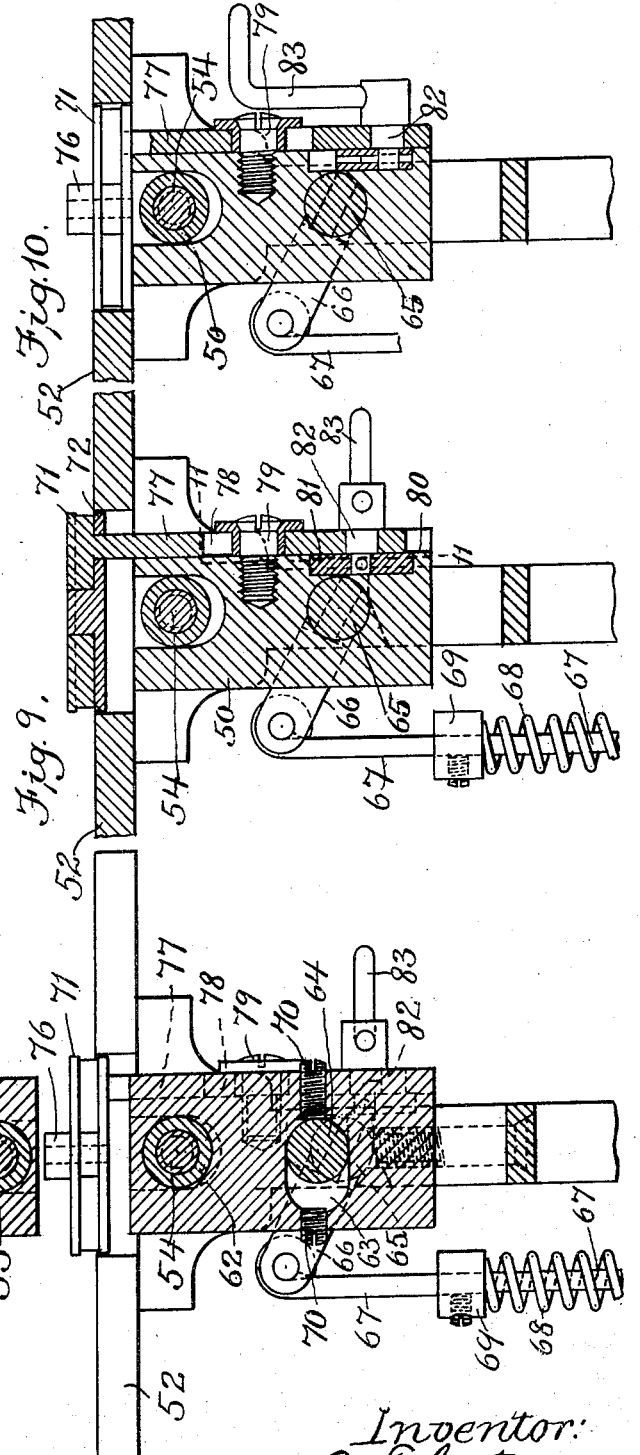
Witnesses:
F. R. Roulstone
P. W. Pezzetti
Inventor:
A. F. Preston
by Wright, Brown, Quinby & May
Atty

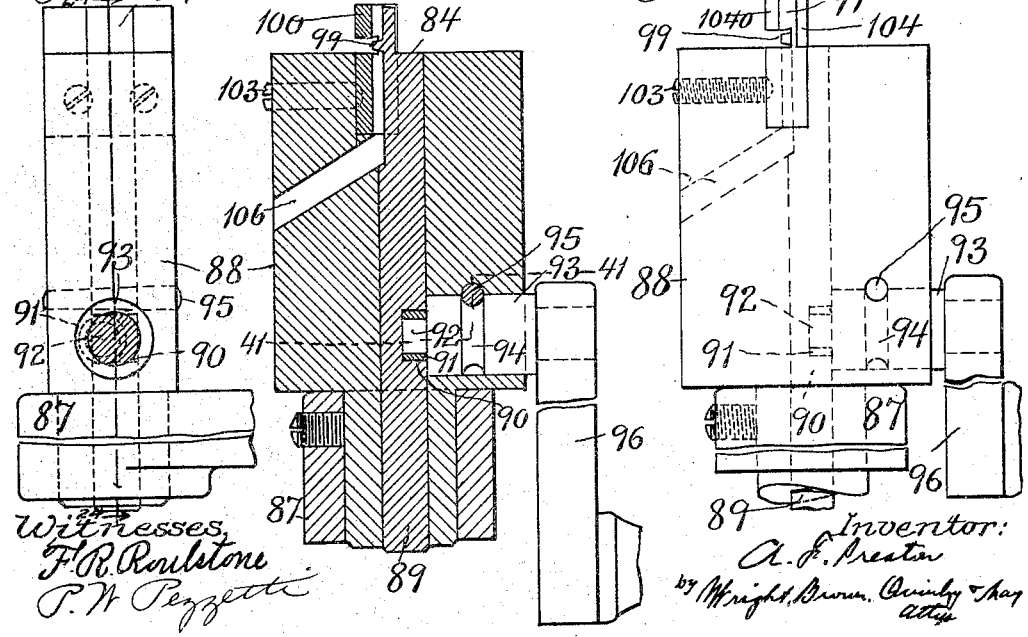

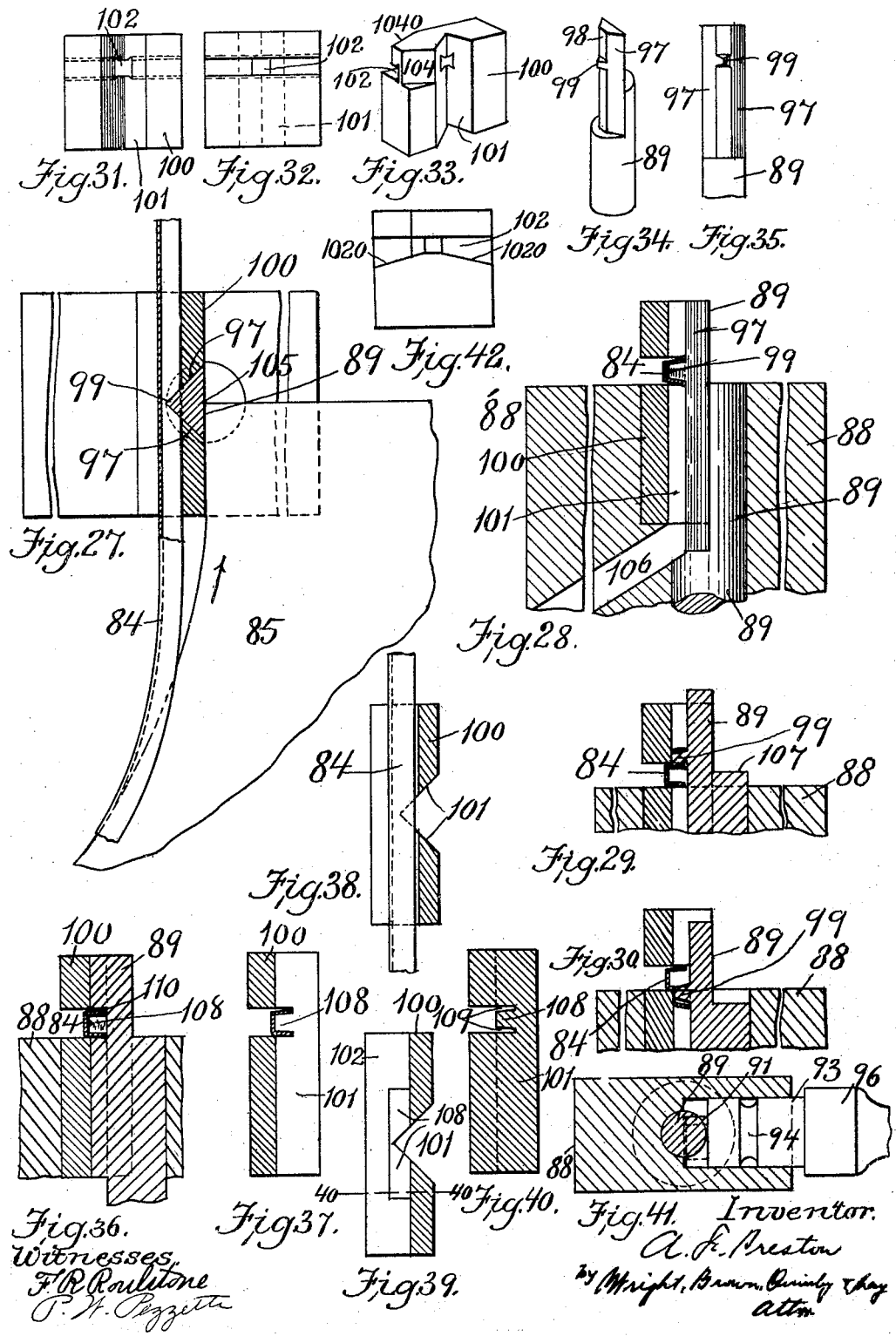

UNITED STATES PATENT OFFICE.

ALBERT F. PRESTON, OF BOSTON, MASSACHUSETTS.

BINDING-MACHINE.

No. 896,461.     Specification of Letters Patent.     Patented Aug. 18, 1908.

Application filed March 21, 1908. Serial No. 422,452.

*To all whom it may concern:*

Be it known that I, ALBERT F. PRESTON, of Boston, in the county of Suffolk and State of Massachusetts, have invented certain new and useful Improvements in Binding-Machines, of which the following is a specification.

This invention relates to machines for applying metal bindings around the edges of sheet material, which latter is usually fiberboard or pasteboard.

One of the objects of my present invention is to provide a simple and easily operated machine for facilitating the application of metal bindings around the edges of patterns which are used by the cutters for marking and cutting out material used for shoe uppers or other apparel. The metal binding makes the edges of the sheet material more durable, and said binding comprises a strip of metal which is bent into a substantial U shape in cross section before it is applied to the pattern.

Another object of the invention is to provide a machine of this character having means for facilitating the formation of cuts in the flanges of the metal binding, to enable the binding to be quickly and conveniently turned at abrupt corners of the pattern sheet.

To these ends, my invention consists in the construction and combination of parts substantially as hereinafter described and claimed.

Of the accompanying drawings in which similar reference characters indicate the same or similar parts in all of the views, Figure 1 is a side elevation of a complete machine embodying my improvements. Fig. 2 is a plan view of the same. Fig. 3 represents a longitudinal section through the frame of the machine on a larger scale and showing the feed rolls and the back guide and their adjustments. Fig. 4 is a detail sectional view of a somewhat different form of back guide. Fig. 5 is an elevation from the left of Fig. 1, and omitting the flange-cutting mechanism. Fig. 6 represents an elevation from the right of Fig. 1. Fig. 7 represents a section on line 7—7 of Fig. 1 on a larger scale. Fig. 8 represents a section on line 8—8 of Fig. 1, but on a larger scale. Fig. 9 represents a section on line 9—9 of Fig. 3. Fig. 10 is a view similar to Fig. 9, showing some of the parts in differently adjusted positions. Fig. 11 represents a detail section on line 11—11 of Fig. 9. Fig. 12 is a view similar to Fig. 11, but showing a different adjustment. Fig. 13 represents a section on line 13—13 of Fig. 12. Fig. 14, below Fig. 2, is a detail perspective view of the flange-cutting devices. Fig. 15 represents a vertical section through the edge of the pattern and through the binding which is applied thereto, said figure showing also portions of the feed and compressing rolls. Fig. 16 is a plan view similar to a portion of Fig. 2, and illustrating the method of applying the binding to a pattern. Figs. 17, 18, 19 and 20 are detail views of the metal binding. Fig. 21 is a detail view representing the binding applied to an abrupt angular portion of the pattern. Fig. 22 is a detail view looking from the right of Fig. 15. Fig. 23 is a detail elevation of the cutter and the standard therefor. Fig. 24 represents a section on line 24—24 of Fig. 23. Fig. 25 represents the parts shown in Fig. 24 but in elevation. Fig. 26 is a plan view of the parts shown in Fig. 25. Fig. 27 is a fragmentary view on an enlarged scale of the top of the cutting devices, and illustrating the operation of applying the binding to a pattern material. Fig. 28 is an enlarged detail vertical section through the cutting die and plunger, and through the upper portion of the supports therefor. Figs. 29 and 30 are views similar to the upper portion of Fig. 28 and illustrating different steps of the flange cutting operation. Figs. 31 and 32 are detail elevations from opposite sides of the die. Fig. 33 is a perspective view of the die. Figs. 34 and 35 are respectively a perspective view and an elevation of the upper end of the plunger. Figs. 36, 37, 38, 39 and 40 are different sectional views of a slight modification in the relative forming of the cutting die and plunger, as will be made apparent hereinafter. Fig. 41 represents a section on line 41—41 of Fig. 24. Fig. 42 is a view similar to Fig. 32 but showing a preferred form of the transverse recess in the cutting die.

The frame 50 of the machine, supported upon a suitable base or bench 51, is of a substantially well known form, and includes an upper overhanging arm which will permit the insertion of the material being operated upon, between the upper and lower shafts 53 and 54, to which are secured the feed and pressure rolls 55 and 56. A table 52 for the work (the pattern) is suitably supported by the under or lower portion of the frame, said table being cut away at its front as indicated in Fig. 2. A forty-five degree spiral gear 57 is mounted in the frame and meshes with similar gears at the rear ends of the shafts 53 and 54. The gear 57 is on a stud shaft which extends out from the frame and has a crank 58 secured thereto, said crank having a handle whereby the operative may actuate the shafts and the rolls 55 and 56 simultaneously in opposite directions so that the nip of the two rolls will serve to feed the work forward.

The outer or front end of the shaft 53 extends through a bearing in a block 59 which is adjustably secured to the face of the overhanging portion of the frame by means of a binding screw 60, a screw 61, tapped into the top of the frame and bearing on the block 59, serving to hold the bearing block 59 and consequently the upper roll 55 firmly in the desired adjusted position.

The outer or front end of the lower shaft 54 extends through a bearing in a block 62 which slides vertically in suitable ways in the face of the lower portion of the frame, and is formed with a horizontal slot 63 (see Fig. 8) which slot receives a crank 64 at the front end of a rock shaft 65, said rock shaft having an arm 66 extending out through a suitable opening in the frame, a link 67 connecting said arm 66 with a suitable treadle (not shown). A spring 68 surrounding the link 67 and pressing upward against a collar 69 secured on the link 67, normally holds the parts in the position shown in Fig. 8. But when the link 67 is drawn downward against the stress of spring 66, the crank 64 draws the block 62 downward and therefore separates the lower roll from the upper one to permit the insertion of the work between the two rolls. It will be observed that, when the crank is in the position shown in Fig. 8, the said crank is practically on a dead center, and the lower roll cannot practically yield relatively to the upper roll. Two set screws or adjustable stops 70 are mounted one at each end of the slot 63. By adjusting these stop screws inward, the limit of movement of the crank may be more or less restricted. The left hand screw or stop 70 may be set in to limit the extent to which the crank may lower the bearing block 62, and the right hand stop screw 70 may be adjusted inward to prevent the crank from moving up to dead center position. When the crank is off dead center, the pressure of the spring 68 is brought to bear so as to cause the lower roll to bear against the under side of the work with a somewhat yielding pressure.

Referring to Figs. 2, 3, 8, 9 and 10, it will be seen that the back guide comprises upper and lower members 71 and 72 respectively, united by one or more rivets 73. Said back guide at its front is provided with a small hard lower roll 74 mounted in a recess in the member 71 on a vertical pin or axle 75, which pin or axle also projects above the upper surface of the member 71 and has a small hard upper roll 76 mounted thereon. When the parts are in the position shown in Fig. 3, the roll 76 is out of position for use. But this back guide is vertically movable for reasons which I shall presently describe. The back guide is mounted on a slide 77 having a slot 78 through which a guide pin or screw 79 passes into the frame as clearly shown in Fig. 9. As shown in Figs. 11, 12 and 13, the frame is formed with a rectangular recess 80 below the screw 79, which recess receives a cam 81 secured, as by a pin, to a stud shaft 82, which is mounted in the slide 77 of the back guide. Said stud shaft is provided with a crank handle 83 by means of which it and the cam 81 may be turned to either of the positions shown in Figs. 11 and 12. When in the position shown in Fig. 11, the slide 77 (in which the shaft 82 is mounted) is free to drop, thus lowering the back guide into the recess formed therefor in the table 52. But when the crank handle 83 is actuated to turn the cam to the position shown in Fig. 12, the slide 77 and the back guide are raised to the position shown in Figs. 3 and 9.

When the back guide is in the position last described, there is presented, for the pressure of the pattern and binding strip against it, a curved surface, the radius of which is that of the front portion of the member 71, but the middle portion of which curved bearing surface is occupied by the hard small roll 74. This is best illustrated in Fig. 16, which illustrates the pattern 85 as having a binding strip 84 applied thereto, the operator pressing the pattern inward against the back guide as the pattern is moved along by the feed and compressing rolls so that the binding can be bent inward to follow the reentrant curve of the pattern. If the reentrant curve of the pattern or a certain portion of it be on the arc of a circle of a very short radius, it is desirable that the work be pressed against the small roll 76. For this purpose, the operator actuates the crank handle 83, as heretofore described, so that the back guide will drop to its lower position (shown in Fig. 10), thus bringing the roll 76 into the horizontal plane of the nip of the feed and compressing rolls 55, 56. This small back roll 76 enables the operator to force the binding into a small reëntrant curve of the edge of the pattern. The construction of the back guide so far described is one that does not permit either of the members 71, 72 of the back guide to rotate, although the small rolls 74, 76 may do so. Sometimes it is desirable that there shall be presented a circular surface of considerable area free to rotate. In Fig. 4, I have illustrated a form of back guide in which there is a freely rotating large lower roll 740 which, in this form, would be employed instead of the roll 74. In this form shown in Fig. 4, the slide 77 is shown as provided with a horizontal arm 771 to which a hub 772 is secured as by screws, said screws passing also through, and securing, the upper member 710 of the back guide. Rotatably mounted on the member 710, is the upper small roll 76.

I do not limit myself, in any case, to a rotating member of the back guide, nor to a complete circular form for any member of it, since all of the members may be non-rotary and in that case it is only essential that the front portion, against which the back of the binding strip bears, shall be curved. This feature of my invention therefore comprises a plurality of back guide surfaces which present curves of different radii, either one of which may be brought opposite the space where the pattern is nipped by the rolls 55, 56.

It is to be understood that, in the operation of the machine so far described, the operator takes a pattern 85 and slips on to one edge thereof, one end of a previously formed binding strip 84 which strip is of a form indicated in Figs. 15 to 22 inclusive. By relatively manipulating the pattern and binding strip so that they are fed together along between the rolls 55 and 56 and against the back guide, the strip is applied to, and pinched upon, the edge of the pattern so as to reinforce the latter. As shown in Figs. 3 and 15, the rolls 55, 56 are beveled both outwardly and rearwardly so that they have the greatest diameter at a point somewhat back of their front faces. This causes the edges of the binding strip to be pressed firmly into the material of the pattern sheet, the two being held together by a kind of dovetailed fit. Straight lines and curves are easily followed. But when an abrupt angle of the pattern is presented, it is desirable to notch the upper and lower flange of the strip, so that it may be bent as indicated in Fig. 21. I have provided means whereby this notching may be done at the exact point without requiring any marking of the strip such as has heretofore been practically universally done. I shall now proceed to describe the means whereby the proper and accurate notching of the flanges of the strip is performed. It will be readily understood that, if a binding strip of the form shown in Figs. 15 to 22, has its flanges notched as at $x$ in Fig. 20, by a cutting device of any nature which moves in one direction through both flanges of the strip, the cut will leave a rough or "wire" edge on the inner side of one flange and on the outer side of the other flange. Such rough or "wire" edge is liable to interfere with the placing of the strip upon the edge of the pattern. Moreover, when the cutter moves in but one direction in making the notches in both flanges, the chip removed from one edge or flange gets in the way of the cutter as it proceeds to make the corresponding cut in the other edge or flange. I prefer to form the notches in the strips in such manner that the notch is formed by an outward movement of the cutter through each flange, whereby the inner surface of the flange is left smooth. Whatever rough edge is left on the outer surface is then rolled down by the rolls 55 and 56 after the strip has been fitted to the edge of the pattern. I will now describe the means whereby the cutting is produced as just described, and in this connection reference should be made to practically all of the figures on Sheets 5 and 6 excepting Figs. 36 to 40. The support for the cutting mechanism, however, is best illustrated in Fig. 1, in which a bracket 86 is shown as secured to the frame by one or more suitable bolts, said bracket having a hollow base 87 at its outer end. Secured in said base 87 (see Fig. 24) is the body 88 of the cutter, in which is mounted a plunger 89 having a transverse recess 90 which receives a roll 91 mounted on a crank pin 92 of a stud shaft 93, the latter being mounted in the body 88 and having an annular groove 94, receiving a pin 95, and having a crank 96. The pin 95 retains the stud shaft in position but permits its removal, after removing the pin, so that the plunger 89 can be withdrawn from the body 88. By rotating the crank 96, the plunger is given a reciprocating motion in the head 88, or the crank may be given an oscillatory movement to attain the same result. I do not limit myself, however, to this particular mechanism for reciprocating the plunger, as any other mechanical equivalent may be substituted therefor.

The upper end of the plunger 89 is cut away and formed with beveled sides 97 as best shown in Fig. 34. It is provided with a flat face 98 and with an angular cutting tooth 99. The portion of the plunger indicated at 97, 98 and 99 may be formed integral with the upper end of the plunger, or may be made separate therefrom and attached thereto by any suitable means. To coöperate with the cutting tooth 99, a die block 100 is secured in a recess in the upper portion of the body 88, as by a screw or screws 103, said die block being formed with a vertical angular groove or recess 101 and a transverse recess 102 formed in the other side of the die block, said recess 102 forming a guide-way for the binding strip 84 and intersecting the vertical groove or recess 101 so that the flanges of the strip 84 extend through into the path of the cutter 99. The inner portion of the transverse recess or strip guide-way 102 is preferably slightly undercut as shown in Fig. 28, but this is not essential. The binding strip 84 passes along the recess 102, and, as will be readily understood, portions of its upper and lower flanges cross the vertical groove 101 in the path of the cutting tooth 99, a single block 100 therefore serving to guide both the strip and the cutter. This structure, as best illustrated in Fig. 27, brings the groove and guide-way so close together, that the strip can pass along one side of the die block and the pattern 85 along the other side, with the strip attached to the binding at a distance not far from the point where the strip is to be notched by the cutter. The location of the tooth 99 relatively to the die block is such that it normally stands in the intermediate position shown in Fig. 28, the crank mechanism being such that the plunger is reciprocated to carry the cutting tooth above said intermediate plane as shown in Fig. 29, and also below that plane as shown in Fig. 30. Therefore, one movement of the cutting tooth cuts out a triangular piece from one flange of the binding strip, and the other movement cuts out a similar piece from the other flange of the strip. Both cutting movements are in an outward direction relative to the interior of the binding strip, and therefore the inner edges of the cuts will be left smooth. The chips or triangular pieces that are cut out from the upper flange fall out of the recess 102 when the pattern is removed, and those which drop downward, escape through a suitable opening 106.

In order to provide for the ready escape of chips which fall on the lower wall or floor of the transverse recess 102, I preferably bevel or incline said floor, as at 1020 in Fig. 42. The shifting of the pattern along then pushes off any chips lodged on the inclined surfaces 1020. With a machine in which the cuts are all formed by one cutting edge, that edge becomes dull quickly. Since my machine employs different cutting edges for the two flanges of the strip, said cutting edges last twice as long as where one cutting edge notches both flanges.

The die block 100 is formed with beveled faces 104 and 1040 at that edge toward which the work approaches, see Fig. 33, and the rear face of the cutting member or plunger 89 is formed with a vertical gage mark 105 (see Figs. 27 and 14). This gage mark 105 is exactly opposite the apex of the cutting tooth 99. Therefore when the pattern 85 with a binding strip pinched thereon along one edge to a point somewhat short of an abrupt angle of the pattern, is pushed along in the direction of the arrow in Fig. 27 until the angle comes to the gage mark 105, the operative actuates the cutter both upward and downward so as to notch the strip at the exact point to enable the strip to be bent around the angle as shown in Figs. 16 and 21. This avoids necessity for any marking of the binding strip by the operative. While this is not essential, I prefer to form the plunger so that, when it is raised to the position indicated in Fig. 29, its top or shoulder portion 107 will slightly lift the pattern simultaneously with the upward cutting movement of the tooth 99. I do not limit myself, however, to a structure of cutter and die which operates to remove the triangular pieces only during outward movement, since I may for some purposes, prefer to produce both cuts in the two flanges by an inward movement of the cutting tooth. To effect this result, I may form the cutter and die as indicated in Figs. 36 to 40 inclusive. In said figures, the die block, instead of having a recess which is entirely open throughout its length, is formed with an internal rib 108 that is intersected by the vertical recess 101, said rib leaving channels 109 for the flanges of the strip. The plunger 89, instead of having a tooth as in Fig. 34, fits snugly in the recess 101 of the die block and is formed with a transverse notch or recess 110 in the location occupied by the cutting tooth in the other form, the upper and lower walls of said notch or recess 110 forming cutters or teeth adapted to remove triangular pieces from the flanges of the strip by inward movements, the flanges being supported by the portions of the rib 108 each side of the recess 101.

I prefer to employ the form of die and cutter plunger first described because "wire edges" that are produced are both on the outside and therefore I can employ a strip that fits more closely to the pattern, in thickness, without interfering with the feed of the pattern material.

I claim:—

1. A pattern binding machine comprising in its construction rolls for bending the flanges of the binding strip along the edge of the pattern, a support for the pattern, and a notching cutter mounted to reciprocate adjacent to said support, an indicator being provided to gage the position of an angle of the pattern during the notching of the strip flanges whereby the location of the notch may be determined to enable the strip to be bent around said pattern angle.

2. A pattern binding machine comprising in its construction rolls for bending the flanges of the binding strip along the edge of the pattern, a back guide, a support for the pattern, and a notching cutter mounted to reciprocate adjacent to said support, an indicator being provided to gage the position of an angle of the pattern during the notching of the strip flanges whereby the location of the notch may be determined to enable the strip to be bent around said pattern angle.

3. A pattern binding machine comprising in its construction pressure rolls to pinch the flanges of the binding strip on the edge of the pattern, and a back guide having a plurality of differently curved acting faces adapted to be brought interchangeably opposite the nip of the rolls.

4. A pattern binding machine comprising in its construction pressure rolls to pinch the flanges of the binding strip on the edge of the pattern, and a vertically adjustable back guide comprising two differently curved surfaces one above the other.

5. A pattern binding machine comprising in its construction pressure rolls to pinch the flanges of the binding strip on the edge of the pattern, and a vertically adjustable back guide comprising a large roll and a small roll having their acting faces substantially in the same vertical plane.

6. A pattern binding machine comprising in its construction pressure rolls to pinch the flanges of the binding strip on the edge of the pattern, a movable support, a plurality of back-guide members carried by said support, and means for adjusting said support to bring either one of said members opposite the nip of the rolls.

7. A pattern binding machine comprising in its construction pressure rolls to pinch the flanges of the binding strip on the edge of the pattern, a vertically movable support, a large roll and a small roll mounted on said support one above the other, and means for raising and lowering said support.

8. In a machine of the character described, a die block having a groove in one side and a strip guide-way in the other side intersecting said groove, and a reciprocating cutter in said groove.

9. In a machine of the character described, a die block having a vertical groove in one side and a strip guide-way in the other side intersecting said groove, and a reciprocating cutter in said groove.

10. In a machine of the character described, a die block having a groove in one side and a strip guide-way in the other side intersecting said groove, and a reciprocating cutter in said groove, and having means for actuating it to notch one edge of the strip in one direction and the other edge in the opposite direction.

11. In a machine of the character described, a die-block having a groove with beveled sides in one side of said block and a strip guide-way in the other side of said block and intersecting said groove, a reciprocating cutter having beveled sides mounted in said groove, and means for actuating the cutter to notch one end of the strip in one direction and the other edge in the opposite direction.

12. In a machine of the character described, a die block having a groove in one side and a strip guide-way in the other side intersecting said groove, and a reciprocating cutter comprising a slide or plunger having a cutting tooth normally resting in a plane between the edge flanges of the strip, and means for reciprocating the slide or plunger to cause the said tooth to traverse the said edge flanges.

13. In a machine of the character described, a die block having a bevel-sided vertical groove in one face and a transverse strip guide-way in its opposite face, the two grooves intersecting, a slide or plunger in said vertical groove and coinciding therewith in form and having a cutting tooth projecting to traverse the path of movement of a strip in said transverse guide-way, and means for reciprocating the slide or plunger.

14. In a machine of the character described, a die block having a bevel-sided vertical groove in one face and a transverse strip guide-way in its opposite face, the two grooves intersecting, a slide or plunger in said vertical groove and coinciding therewith in form and having a cutting tooth projecting to traverse the path of movement of a strip in said transverse guide-way, and means for reciprocating the slide or plunger, the parts being relatively connected and actuated to shift the tooth first from an intermediate position to an extreme outer position, then to the extreme opposite position, and then back to said intermediate position.

15. The combination with two coöperating cutting members one of which is provided with a guide for a binding strip, of means for actuating one of said members to notch the edges of the strip, one of said cutting members being provided with an indicator to coöperate with an angle of the pattern to determine the proper position of the strip in said guide during the cutting or notching operation.

16. The combination with a die block having a vertical groove in one face and a transverse groove in its opposite face, the two grooves intersecting, of a slide mounted in said vertical groove and having a cutting tooth projecting to traverse the path of movement of a strip in said transverse groove, and means for reciprocating said slide, the slide being provided with an indicator in the plane of the traverse of the apex of the said cutting tooth.

17. In a machine of the character described, a support for a trough-shaped binding strip, and means for forming cuts in opposite directions in the edges of said strips, the space at the rear of the cutting means being open and unobstructed to permit the passage behind it of a piece of material to which a length of binding strip is being attached.

In testimony whereof I have affixed my signature, in presence of two witnesses.

ALBERT F. PRESTON.

Witnesses:
  A. W. HARRISON,
  P. W. PEZZETTI.